W. H. DOWNING.
Oil-Pump.
No. 211,230. Patented Jan. 7, 1879.
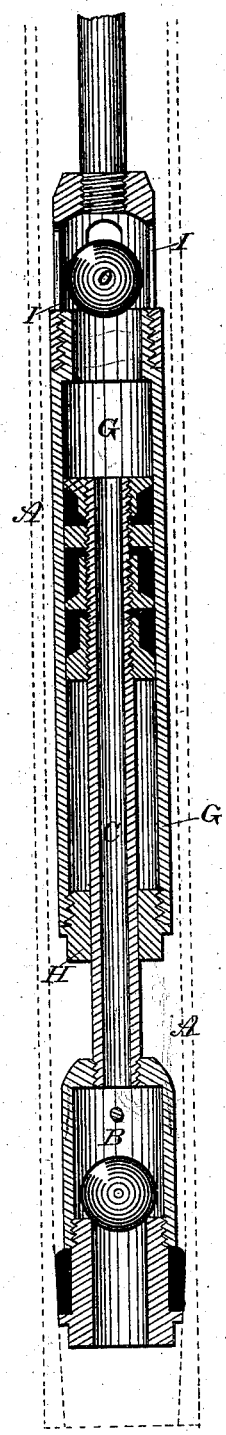
Witnesses:
J. W. Garner,
W. S. D. Haines
Inventor:
Wm. H. Downing,
per
J. A. Lehmann,
atty

UNITED STATES PATENT OFFICE.

WILLIAM H. DOWNING, OF MILLERSTOWN, ASSIGNOR TO R. T. SALVAGE AND GEORGE W. DOWNING, OF BARNHART'S MILLS, PENNSYLVANIA, ONE-THIRD TO EACH.

IMPROVEMENT IN OIL-PUMPS.

Specification forming part of Letters Patent No. 211,230, dated January 7, 1879; application filed October 14, 1878.

*To all whom it may concern:*

Be it known that I, WILLIAM H. DOWNING, of Millerstown, in the county of Butler and State of Pennsylvania, have invented certain new and useful Improvements in Oil-Pumps; and I do hereby declare the following to be a full, clear, and exact description of the invention, such as will enable others skilled in the art to which it pertains to make and use it, reference being had to the accompanying drawing, which forms part of this specification.

My invention relates to an improvement in deep-well pumps; and it consists in the arrangement and combination of parts, whereby a cheaper, simpler, and more efficient pump is produced, as will be more fully described hereinafter.

The accompanying drawing represents a vertical section of my invention.

A represents the tubing of the well, which has a tapering seat at its lower end for the cylinder or pipe B to rest upon. This pipe is provided with a ball-valve in its lower end, and is packed upon its outside, so as to make a tight joint with the tubing. Screwed or otherwise fastened in the top of this pipe, which remains stationary at the bottom of the tubing, is a smaller and much longer tube or pipe, C, which is packed upon its upper end with cup-shaped packing, so as to fit the inside of the vertically-moving cylinder G air and water tight. In the lower end of cylinder G is screwed a nut, H, which prevents the pipe C from being separated from the cylinder G, and also to enable the pipe B to be raised upward out of the well whenever it is so desired.

Upon the upper end of the cylinder G is screwed a cage, I, for a ball-valve, O, which cage also screws upon the lower end of the pump-rods. The cylinder G, being worked up and down by the pump-rod, alternately forms a vacuum, into which the oil or other fluid is forced by atmospheric pressure through the bottom of pipe B up into the cylinder, and then, when the cylinder descends, the fluid, not being able to escape on account of the valve in the lower end of the pipe B, passes upward through the cage toward the surface of the ground.

A pump constructed as above described does not give dirt and grit in the oil or water the same chance to cut and injure the packing as in the ordinary pump, and hence the packing is not destroyed as rapidly, and the pump does not require to be raised out of the well so frequently for the purpose of repair.

Another advantage is that the pump is simple in construction, more easily operated, and cheaper in every way.

Having thus described my invention, what I claim, and desire to secure by Letters Patent, is—

The combination of the pipe B, provided with a packing upon its outside and a valve in its lower end, pipe C, packed upon its upper end, cylinder G, having a valve in its upper end, and means for its connection with the pump-rods, substantially as shown and described.

In testimony that I claim the foregoing I have hereunto set my hand this 10th day of October, 1878.

WILLIAM H. DOWNING.

Witnesses:
   C. G. ESLER,
   ISAAC BLAKELY.